US010826416B2

(12) United States Patent
Hatahara et al.

(10) Patent No.: US 10,826,416 B2
(45) Date of Patent: Nov. 3, 2020

(54) MOTOR DEVICE AND MOTOR DRIVE CONTROL METHOD

(71) Applicant: MINEBEA MITSUMI Inc., Nagano (JP)

(72) Inventors: Satoshi Hatahara, Yaizu (JP); Wataru Nogamida, Yokosuka (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/299,573

(22) Filed: Mar. 12, 2019

(65) Prior Publication Data
US 2019/0288621 A1 Sep. 19, 2019

(30) Foreign Application Priority Data

Mar. 19, 2018 (JP) .................... 2018-051361

(51) Int. Cl.
H02P 3/18 (2006.01)
H02P 25/16 (2006.01)
H02P 21/26 (2016.01)
H02P 6/30 (2016.01)
H02P 6/08 (2016.01)
H02P 25/22 (2006.01)
(Continued)

(52) U.S. Cl.
CPC ............ H02P 6/30 (2016.02); H02P 6/085 (2013.01); H02P 6/12 (2013.01); H02P 6/16 (2013.01); H02P 25/22 (2013.01)

(58) Field of Classification Search
CPC ............ H02P 7/08; H02P 25/18; H02P 21/24
See application file for complete search history.

(56) References Cited

U.S. PATENT DOCUMENTS

2009/0302792 A1* 12/2009 Osada ................ H02P 29/032
318/400.21
2011/0279975 A1* 11/2011 Shimizu .................. H02P 7/29
361/695
2013/0093374 A1 4/2013 Chen
(Continued)

FOREIGN PATENT DOCUMENTS

JP 10-271881 A 10/1998
JP 2009-303298 A 12/2009
(Continued)

OTHER PUBLICATIONS

Notice of Reasons for Refusal dated Aug. 24, 2020 for corresponding Japanese Application No. 2018-051361 and English translation.

Primary Examiner — Bickey Dhakal
Assistant Examiner — Charles S Laughlin
(74) Attorney, Agent, or Firm — Pearne & Gordon LLP

(57) ABSTRACT

A motor device includes a motor having coils of three phases and a single-phase coil. The motor device includes a drive circuit of a first system capable of supplying a drive current to the coils of the three phases and a drive circuit of a second system capable of supplying a drive current to the single-phase coil. The drive circuit of the second system is different from the drive circuit of the first system. The drive circuit of the first system includes a three-phase inverter circuit connected to one end of each of the coils of the three phases, and the drive circuit of the second system includes a single-phase inverter circuit connected to both ends of the single-phase coil.

13 Claims, 12 Drawing Sheets

(51) Int. Cl.
*H02P 6/16* (2016.01)
*H02P 6/12* (2006.01)

(56) References Cited

U.S. PATENT DOCUMENTS

| | | |
|---|---|---|
| 2014/0177165 A1 | 6/2014 | Ishii et al. |
| 2016/0261215 A1 | 9/2016 | Ishii et al. |
| 2018/0115180 A1* | 4/2018 | Shin ........................ B60L 53/24 |

FOREIGN PATENT DOCUMENTS

| | | |
|---|---|---|
| JP | 2011-205791 A | 10/2011 |
| JP | 2013-031331 A | 2/2013 |
| JP | 2013-090573 A | 5/2013 |
| JP | 2014-091455 A | 5/2014 |

* cited by examiner

MOTOR DEVICE AND MOTOR DRIVE CONTROL METHOD

CROSS REFERENCE TO RELATED APPLICATIONS

This application claims the benefit of Japanese Patent Application No. 2018-051361, filed Mar. 19, 2018, which is hereby incorporated by reference in its entirety.

BACKGROUND

Technical Field

The present disclosure relates to a motor device and a motor drive control method and, more specifically, to a motor device including a motor drive control device for driving a three-phase motor and to a motor drive control method.

Background

In the motor device driving the three-phase motor by the motor drive control device, failures may occur in a drive circuit of the motor drive control device so that it becomes impossible to drive the motor. When it becomes impossible to drive the motor as mentioned above in use of driving the motor in a prescribed rotational direction and an external force works to forcibly rotate the motor in a direction opposite to the prescribed rotational direction, which may cause problems.

For example, in a case of driving a fan motor by the motor drive control device, the drive circuit of the motor drive control device may break down and a fuse of a power line may blow out due to a large electric current flowing in which may cause the motor drive control device to become inoperative. If the motor drive control device becomes inoperative and drive of the fan motor stops, when air flows into the stopped fan motor due to an action of another fan motor used along with the stopped fan motor, for example, the stopped fan motor may be rotated inversely. For example, in a case where a plurality of fan motors are used for cooling a device surrounded by a housing and one of the fan motors is rotated inversely in a manner described above, a the cooling of the device may be inhibited.

Related to such issues caused when the drive circuit of the motor drive control device breaks down, Japanese Patent Application Laid-Open No. 2014-91455 discloses a structure having drive circuits of two systems.

The device disclosed in Japanese Patent Application Laid-Open No. 2014-91455 includes the drive circuits of the two systems having equivalent functions. Thus, even in a case where the drive circuit of the one of the systems breaks down, the motor can be driven equivalently by using the drive circuit of the other system. However, the scale of the circuits becomes larger since the drive circuits of the two equivalent systems are used. Therefore, manufacturing cost of the motor drive control device becomes increased.

The present disclosure is related to providing the motor device and the motor drive control method capable of preventing the motor from being rotated in the opposite direction even in a case where the drive circuit used mainly breaks down.

SUMMARY

According to a first aspect of the present disclosure, a motor device includes a motor having coils of three phases and a single-phase coil. The motor device includes a drive circuit of a first system capable of supplying a drive current to the coils of the three phases and a drive circuit of a second system capable of supplying a drive current to the single-phase coil. The drive circuit of the second system is different from the drive circuit of the first system. The drive circuit of the first system includes a three-phase inverter circuit connected to one end of each of the coils of the three phases, and the drive circuit of the second system includes a single-phase inverter circuit connected to both ends of the single-phase coil.

Preferably, the single-phase coil is wound around at least one of a plurality of teeth, the coils of the three phases being wound around the plurality of teeth.

Preferably, the single-phase coil is wound, respectively, around at least one of the teeth around which the coil of a first phase among the coils of the three phases is wound, at least one of the teeth around which the coil of a second phase among the coils of the three phases is wound, and at least one of the teeth around which the coil of a third phase among the coils of the three phases is wound.

Preferably, a winding direction of the single-phase coil for the teeth around which the coil of any one phase among the coils of the three phases is wound is different from a winding direction of the single-phase coil for the teeth around which the coils of other two phases are wound.

Preferably, the motor device further includes a drive control unit configured to drive the motor by the drive circuit of the first system by controlling an action of the drive circuit of the first system, a detection unit configured to detect that the drive circuit of the first system is in an abnormal state, and a switching unit configured to switch the drive circuit for applying the drive current to the motor from the drive circuit of the first system to the drive circuit of the second system when the detection unit detects that the drive circuit of the first system is in the abnormal state.

Preferably, the motor device further includes a monitoring unit configured to monitor an applied power state to the drive circuit of the first system from a power supply. The detection unit detects that the drive circuit of the first system is in the abnormal state according to a monitored result acquired by the monitoring unit.

Preferably, the motor device further includes a single position sensor configured to output a position signal according to a position of a rotor of the motor. The drive control unit controls the action of the drive circuit of the first system based on the position signal, the drive circuit of the second system comprises a single-phase drive unit configured to control an action of the single-phase inverter circuit, and the single-phase drive unit controls the action of the single-phase inverter circuit based on the position signal.

Preferably, the position sensor is a magnetic sensor, and the position sensor is placed such that rise or fall of the position signal occurs at an electric angle within a prescribed angle range with respect to a zero-cross point of a back electromotive force of the single-phase coil.

Preferably, the prescribed angle range is a range of ±30 degrees at the electric angle.

Preferably, the position sensor is built into the drive circuit of the second system.

Preferably, the switching unit performs switching of the drive circuit applying the drive current to the motor through applying a control voltage to the drive circuit of the second system, and the drive circuit of the second system does not apply the drive current when the control voltage is a reference voltage, and applies the drive current when the control voltage is a prescribed drive voltage.

Preferably, a terminal to which the control voltage of the drive circuit of the second system is applied is connected to a voltage source configured to output the prescribed drive voltage, and when neither the drive control unit action nor the switching unit action is performed, the prescribed voltage is applied by the voltage source so that the drive current is applied to the motor by the drive circuit of the second system.

According to another aspect of the present disclosure, a motor drive control method is a motor drive control method for driving a motor having coils of three phases and a single-phase coil by supplying a drive current to the motor by using the motor drive control device. The motor drive control device includes a drive circuit of a first system capable of supplying a drive current to the coils of the three phases, and a drive circuit of a second system capable of supplying a drive current to the single-phase coil and different from the drive circuit of the second system. The drive circuit of the first system includes a three-phase inverter circuit connected to one end of each of the coils of the three phases, and the drive circuit of the second system includes a single-phase inverter circuit connected to both ends of the single-phase coil. The motor drive control method includes a drive control step of driving the motor by the drive circuit of the first system by controlling an action of the drive circuit of the first system, a detection step of detecting that the drive circuit of the first system is in an abnormal state in a case where the motor is driven by the drive circuit of the first system, and a switching step of switching the drive circuit for applying the drive current to the motor from the drive circuit of the first system to the drive circuit of the second system when it is detected in the detection step that the drive circuit of the first system is in the abnormal state.

According to the present disclosure, it is possible to provide the motor device and the motor drive control method capable of preventing the motor from being rotated in the opposite direction even in a case where the mainly used drive circuit breaks down.

DETAILED DESCRIPTION

Hereinafter, a motor device according to an embodiment of the present disclosure will be described.

Embodiments

Figure 1:
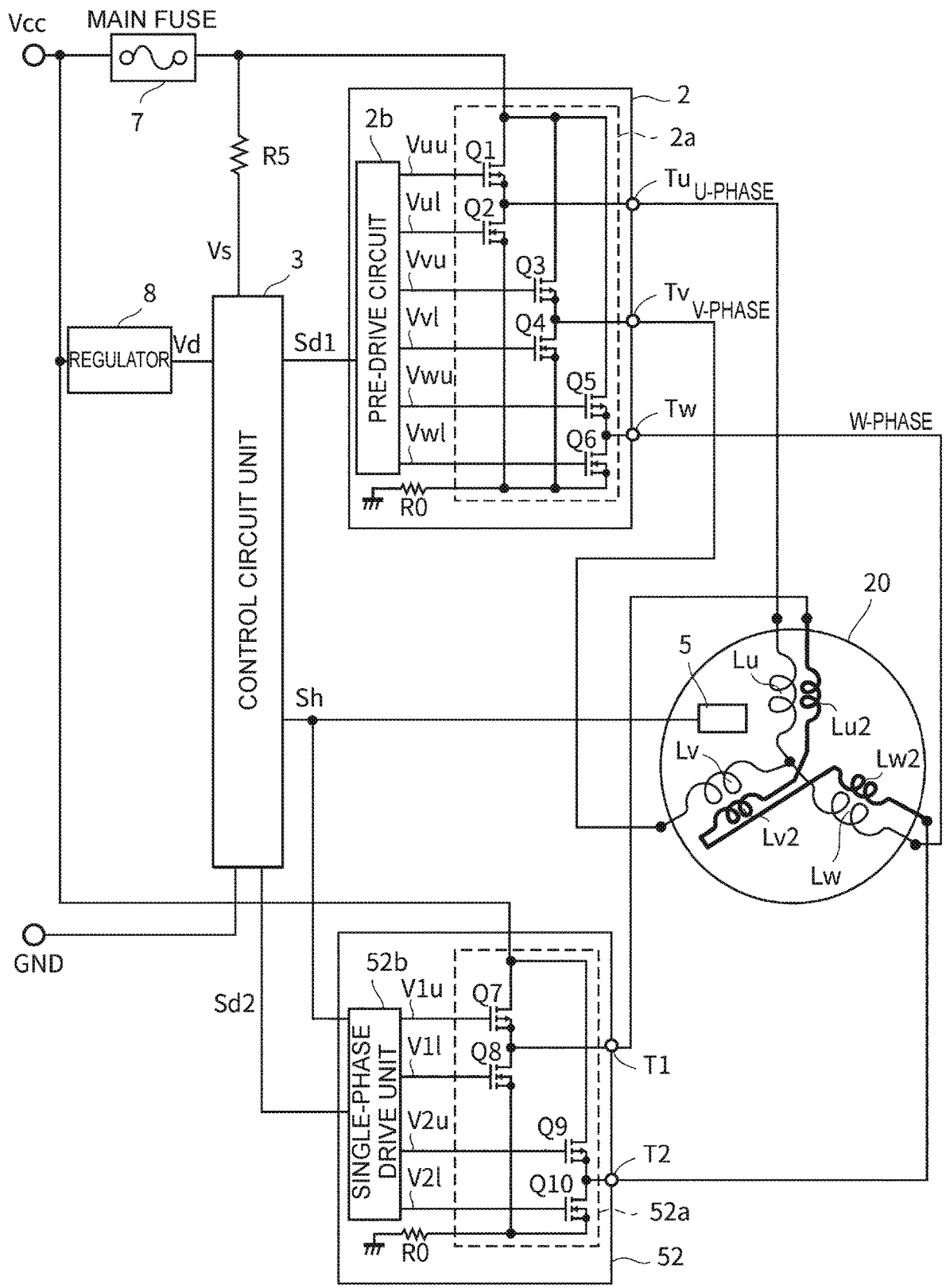
FIG. 1 is a diagram showing a structure of a motor device according to one embodiment of the present disclosure.
Figure 2:
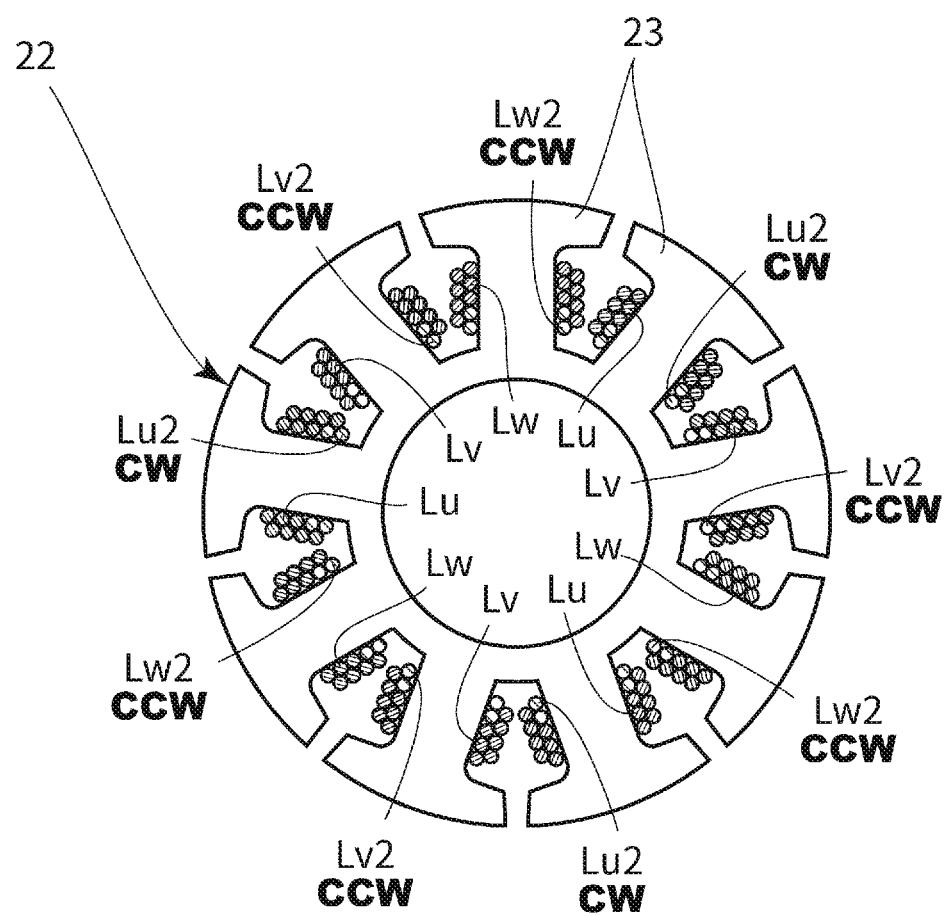
FIG. 2 is a diagram showing an example of a stator of a motor of the motor device.

FIG. 1 is a diagram showing a structure of a motor device 1 according to one embodiment of the present disclosure. FIG. 2 is a diagram showing an example of a stator of a motor 20 of the motor device 1.

As shown in FIG. 1, the motor device 1 includes the motor 20 and a motor drive control device. The motor drive control device supplies a drive current to the motor 20 to drive the motor 20. The motor 20 is a three-phase motor including coils Lu, Lv, and Lw of three phases named U-phase, V-phase, and W-phase (examples of a first phase, a second phase, and a third phase). In the present embodiment, the motor 20 includes coils Lu2, Lv2, and Lw2 of the single phase. The motor 20 may be of any kind such as a synchronous motor or a brushless motor.

Note that the coils Lu, Lv, and Lw of the three phases and the coils Lu2, Lv2, and Lw2 of the single phase in FIG. 1 and FIG. 2 are illustrated schematically.

As shown in FIG. 2, the coils Lu, Lv, and Lw of the three phases are wound around each of a plurality of teeth 23 provided to an iron core 22. For example, in a case where nine teeth 23 are provided, each of the coils Lu, Lv, and Lw of the three phases is wound around three teeth 23. As shown in FIG. 1, one end of each of the coil Lu of the U-phase, the coil Lv of the V-phase, and the coil Lw of the W-phase is connected to the motor drive control device, and another end of each of those coils Lu, Lv, and Lw is connected mutually.

As shown in FIG. 2, in the present embodiment, the coils Lu2, Lv2, and Lw2 of the single phase are wound around each of the plurality of teeth 23. That is, in the case where nine teeth 23 are provided, the coils Lu2, Lv2, and Lw2 of the single phase is wound, respectively, around the three teeth 23 around which the coil Lu of the U-phase among the coils Lu, Lv, and Lw of the three phases is wound, the three teeth 23 around which the coil of the V-phase is wound, and at least the three teeth 23 around which the coil of the W-phase is wound. Specifically, the coil Lu2 is wound around the teeth 23 around which the coil Lu of the U-phase is wound, the coil Lv2 is wound around the teeth 23 around which the coil Lv of the V-phase is wound, and the coil Lw2 is wound around the teeth 23 around which the coil Lw of the W-phase is wound. The coil Lu2, the coil Lv2, and the coil Lw2 are connected in series with respect to each other. That is, the coil Lu2, Lv2, Lw2 of the single phase in a connected form has two ends. Note that the coils Lu2, Lv2, and Lw2 of the single phase may be wound around at least one of the teeth 23 around which the coil Lu of the U-phase is wound, at least one of the teeth 23 around which the coil Lv of the V-phase is wound, and at least one of the teeth 23 around which the coil Lw of the W-phase is wound, respectively.

The winding direction of the coils Lu2, Lv2, and Lw2 of the single phase wound around the teeth 23 around which the coil Lu, Lv, or Lw of one of the three phases is wound is different from the winding direction of the coils Lu2, Lv2, and Lw2 of the single phase wound around the teeth 23 around which the coils of the other two phases are wound. In the case shown in FIG. 2, the winding direction of the coil Lu2 for the teeth 23 around which the coil Lu of the U-phase is wound is different from the winding direction of the coil Lv2 for the teeth 23 around which the coil Lv of the V-phase is wound and from the winding direction of the coil Lw2 for the teeth 23 around which the coil Lw of the W-phase is wound. For example, when the winding direction of the coil Lu2 is CW (clockwise direction), the winding direction of the other coils Lv2 and Lw2 is CCW (counterclockwise direction). In other words, when electric currents flow in the coils Lu2, Lv2, and Lw2 of the single phase, the direction of the electric current flowing in the coil Lu2 is different from the direction of the electric current flowing in the other coils Lv2 and Lw2.

As shown in FIG. 1, in addition to the motor 20, the motor device 1 includes a control circuit unit (an example of a drive control unit, an example of a detection unit, an example of a switching unit, and an example of a monitoring unit) 3, and a position sensor 5. Further, the motor device 1 includes a first drive circuit (an example of a drive circuit of a first system) 2 capable of supplying a drive current to the coils Lu, Lv, and Lw of the three phases of the motor 20, and a second drive circuit (an example of a drive circuit of a second system) 52 capable of supplying a drive current to the coils Lu2, Lv2, and Lw2 of the single phase of the motor 20. The second drive circuit 52 is different from the first drive circuit 2. The motor drive control device is formed with the control circuit unit 3, the position sensor 5, the first drive circuit 2, the second drive circuit 52, and the like.

While details are to be described later, the first drive circuit 2 includes a three-phase inverter circuit 2a connected to one end of each of the coils Lu, Lv, and Lw of the three phases, and the second drive circuit 52 includes a single-phase inverter circuit 52a connected to both ends of the coil Lu2, Lv2, Lw2 of the single phase in a connected form. The motor device 1 includes the drive control unit configured to drive the motor 20 by the first drive circuit 2 through controlling actions of the first drive circuit 2, the detection unit configured to detect that the first drive circuit 2 is in an abnormal state, and the switching unit configured to switch the drive circuit for supplying the drive current to the motor 20 from the first drive circuit 2 to the second drive circuit 52 upon detecting by the detection unit that the first drive circuit 2 is in an abnormal state. Further, the motor device 1 includes the monitoring unit configured to monitor a supplying power state from a power supply to the first drive circuit 2. The detection unit detects that the first drive circuit 2 is in an abnormal state according to a monitored result acquired by the monitoring unit. In the present embodiment, the control circuit unit 3 includes functions of the drive control unit, the detection unit, the switching unit, and the monitoring unit. Further, the control circuit unit 3 of the motor device 1 as the drive control unit controls the actions of the first drive circuit 2 based on position signals output from the position sensor 5. The second drive circuit 52 includes a single-phase drive unit (an example of a single-phase drive unit) 52b configured to control actions of the single-phase inverter circuit 52a. The single-phase drive unit 52b controls the actions of the single-phase inverter circuit 52a based on the position signals.

The position sensor 5 corresponds to one of the three phases of the motor 20, and outputs the position signals. The phases of the position signals change by corresponding to the position of a rotor of the motor 20. Specifically, the position sensor 5 is a magnetic sensor such as a Hall element or a Hall IC, for example. In the present embodiment, the position sensor 5 is a Hall IC as a specific example, and the position signal is a Hall signal Sh. The Hall signal Sh output from the position sensor 5 is input to the control circuit unit 3 and the second drive circuit 52. The position sensor 5 detects the position of the rotor at one position of the motor 20, and outputs the Hall signal Sh. In a case of having a function of inputting the position signal to a pre-drive circuit and executing signal processing, the position signal may be input to the pre-drive circuit instead of inputting the position signal to the control circuit unit 3.

The Hall signal Sh turns to high from low (rise; rise edge) when the rotor passes a prescribed position (when the rotor arrives at a first rotary position) while the rotor rotates once, and returns to low from high (fall; fall edge) when the rotor passes another prescribed position (when the rotor arrives at a second rotary position). The Hall signal Sh is a signal which periodically changes to high and low in accordance with rotations of the rotor. The Hall signal Sh is a signal whose phase changes in accordance with the position of the rotor, i.e., in accordance with positional relation regarding each of the phases of the motor 20 and the rotor.

In the present embodiment, only one position sensor 5 is provided, and the Hall signal Sh detected at only one point of the motor 20 is input to the control circuit unit 3 and the second drive circuit 52. The motor device 1 drives the motor 20 by using the control circuit unit 3 with a single sensor method. The single sensor method uses only the one position sensor 5 for detecting the position of the rotor. The position sensor 5 is placed at a position corresponding to the coil Lv2 whose winding direction is different from the other coils Lug and Lw2 (for example, a position between the U-phase and the V-phase of the motor 20).

Note that the position sensor 5 may be a sensor corresponding to any one of other phases of the motor 20. Further, two or three position sensors 5 corresponding to each of the three phases may be provided, and the Halls signal Sh output only from one of those position sensors 5 provided at one point may be input to the control circuit unit 3 and the second drive circuit 52 to be used.

The first drive circuit 2 selectively applies an electric current to the coils Lu, Lv, and Lw of the three phases of the motor 20. That is, the first drive circuit 2 is capable of supplying a drive current to the motor 20. The first drive circuit 2 includes the three-phase inverter circuit 2a connected to one end of each of the coils Lu, Lv, and Lw of the three phases and includes the pre-drive circuit 2b. A drive control signal Sd1 output from the control circuit unit 3 is input to the first drive circuit 2.

The three-phase inverter circuit 2a drives the motor 20 by selectively applying an electric current to the coils Lu, Lv, and Lw of the three phases of the motor 20 based on six kinds of drive signals Vuu, Vul, Vvu, Vvl, Vwu, Vvl, and Vwl output from the pre-drive circuit 2b.

In the present embodiment, the three-phase inverter circuit 2a includes six switching elements Q1 to Q6 for applying the drive current to each of the coils Lu, Lv, and Lw of the motor 20. The switching elements Q1, Q3, and Q5 are high-side switching elements formed with MOFSETs (Metal-Oxide-Semiconductor Field Effect Transistors) of a P-channel connected to a positive electrode side of a direct current power supply via a main fuse 7. The switching elements Q2, Q4, and Q6 are low-side switching elements formed with MOSFETs of an N-channel placed on a negative electrode (in the present embodiment, ground) side of the direct current power supply. Source terminals of the switching elements Q2, Q4, and Q6 are connected to the negative electrode of the direct current power supply via a sense resistance R0. In each of a combination of the switching elements Q1, Q2, a combination of the switching elements Q3, Q4, and a combination of the switching elements Q5, Q6, the two switching elements are connected in series. Further, those three sets of series circuits are connected in parallel to form a bridge circuit. A connection point between the switching elements Q1 and Q2 is connected to an output terminal Tu connected to one end of the coil Lu of the U-phase. A connection point between the switching elements Q3 and Q4 is connected to an output terminal Tv connected to one end of the coil Lv of the V-phase. A connection point between the switching elements Q5 and Q6 is connected to an output terminal Tw connected to one end of the coil Lw of the W-phase. As described above, other ends of the coils Lu, Lv, and Lw not connected to the three-phase inverter circuit 2a are connected to each other in the motor 20.

The pre-drive circuit 2b includes a plurality of output terminals connected to respective gate terminals of the six switching elements Q1 to Q6 of the three-phase inverter circuit 2a. The drive signals Vuu, Vul, Vvu, Vvl, Vwu, and Vwl are output from each of the output terminals to control on/off actions of the switching elements Q1 to Q6. The drive control signal Sd1 output from the control circuit unit 3 is input to the pre-drive circuit 2b. The pre-drive circuit 2b outputs the drive signals Vuu, Vul, Vvu, Vvl, Vwu, and Vwl based on the drive control signal Sd1 to operate the three-phase inverter circuit 2a. That is, the three-phase inverter circuit 2a selectively applies the electric current to the coils Lu, Lv, and Lw of each of the phases of the motor 20 based on the drive control signal Sd1.

The second drive circuit 52 is capable of supplying the drive current to the motor 20. The second drive circuit 52 includes the single-phase inverter circuit 52a connected to the both ends of the coil Lu2, Lv2, Lw2 of the single phase in a connected form. Further, the second drive circuit 52 includes the single-phase drive unit (an example of a single-phase drive unit) 52b configured to operate the single-phase inverter circuit 52a by outputting drive signals V1u, V1l, V2u, and V2l to the single-phase inverter circuit 52a. The second drive circuit 52 is a single chip of single-phase driver IC, for example.

The single-phase inverter circuit 52a applies an electric current to the coils Lu2, Lv2, and Lw2 of the single phase of the motor 20 based on the four kinds of drive signals V1u, V1l, V2u, and V2l output from the single-phase drive unit 52b. In the present embodiment, the single-phase inverter circuit 52a includes four switching elements Q7 to Q10 for supplying a drive current to the coils Lu2, Lv2, and Lw2 of the single phase. The switching elements Q7 and Q9 are high-side elements formed with MOSFETs of the P-channel placed on the positive electrode side of the direct current power supply. The switching elements Q8 and Q10 are low-side switching elements formed with MOSFETs of the N-channel placed on the negative electrode side of the direct current power supply. Source terminals of the switching elements Q8 and Q10 are connected to the negative electrode of the direct current power supply via a sense resistance R0. In each of a combination of the switching elements Q7, Q8 and a combination of the switching elements Q9, Q10, the two switching elements are connected in series.

Further, those two sets of series circuits are connected in parallel. A connection point between the switching elements Q7 and Q8 is connected to an output terminal T1 connected to one end of the coil Lu2, Lv2, Lw2 of the single phase in a connected form (one end of the coil Lu2 in the case shown in the drawing). Meanwhile, a connection point between the switching elements Q9 and Q10 is connected to another end of the coil Lug, Lv2, Lw2 of the single phase in a connected form (one end of the coil Lw2 in the case shown in the drawing).

The Hall signal Sh output from the position sensor 5 is input to the single-phase drive unit 52b. The single-phase drive unit 52b controls actions of the single-phase inverter circuit 52a based on the Hall signal Sh. That is, the single-phase drive unit 52b includes a plurality of output terminals connected to respective gate terminals of the four switching elements Q7 to Q10 of the single-phase inverter circuit 52a. The single drive unit 52b outputs the drive signals V1u, V1l, V2u, and V2l from each of the output terminals based on the Hall signal Sh to control on/off actions of the switching elements Q7 to Q10.

As will be described in details hereinafter, the control circuit unit 3 as the switching unit performs switching of the drive circuits that supplies the drive current to the motor 20 by applying a control voltage to the second drive circuit 52. The second drive circuit 52 supplies no drive current when the control voltage is a reference voltage, and supplies the drive current when the control voltage is a prescribed drive voltage.

In the present embodiment, the second drive circuit 52 performs supplies the drive current according to a potential of a control terminal. Specifically, the second drive circuit 52 performs no applying action when the control voltage is the reference voltage (when connected to the ground, for example), and performs the supplying action when the control voltage is the prescribed voltage (5 V, for example, but not limited to 5 V, and there may be a certain range in the values of the drive voltage). That is, when the reference voltage is applied to the control terminal, the single-phase drive unit 52b of the second drive circuit 52 outputs no drive signals V1u, V1l, V2u, V2l and the single-phase inverter circuit 52a performs no on/off action. Therefore, the drive current is not applied to the coils Lu2, Lv2, and Lw2 of the single phase. In the meantime, when the prescribed voltage is applied to the control terminal, the single-phase drive unit 52b and the single-phase inverter circuit 52a of the second drive circuit 52 are performing an action. Thereby, the drive current is supplied to the coils Lu2, Lv2, and Lw2 of the single phase.

A control signal (an example of the control voltage) Sd2 output from the control circuit unit 3 is input to the control terminal of the second drive circuit 52. The control signal Sd2 is a control voltage having a voltage value of the reference voltage or the prescribed drive voltage, for example, and is a signal having a voltage value of either a low (the reference voltage) or high (the prescribed drive voltage) level. The control circuit unit 3 outputs the control signal Sd2 of the voltage value of either the low or high level to apply the control voltage to the control terminal of the second drive circuit 52. Thereby, whether or not to supply the drive current to the motor 20 by the second drive circuit 52 can be switched by the control circuit unit 3.

The control circuit unit 3 is formed with a microcomputer (MCU), for example. The control circuit unit 3 can be formed by using a programmable device such as DSP (Digital Assistance Processor), FPGA (Field Programmable Gate Array), or the microcomputer. However, the control circuit unit 3 is not limited only to such devices. The control circuit unit 3 may be a digital circuit or the like, for example.

A drive voltage Vd generated by a regulator (an example of a voltage source) 8 is applied to the control circuit unit 3 based on a power supply voltage Vcc.

The control circuit unit 3 outputs the drive control signal Sd1 for driving the motor 20 to the first drive circuit 2 to perform control of the motor 20. The control circuit unit 3 outputs the drive control signal Sd1 for operating the plurality of switching elements Q1 to Q6 to the first drive circuit 2 to perform the control of the motor 20 for rotating the motor 20. The control circuit unit 3 outputs the drive control signal Sd1 to the pre-drive circuit 2b based on the Hall signal Sh output from the position sensor 5.

The control circuit unit 3 switches six current application patterns for applying an electric current to the coils Lu, Lv, and Lw of the three-phase coils by the first drive circuit 2 in a prescribed order according to changes in the phase of the Hall signal.

That is, since the motor 20 includes the coils Lu, Lv, and Lw of the three phases, there are six current application patterns. That is, there are (1) a first current application pattern that is a combination of a high-side U-phase UH and a low-side V-phase VL, (2) a second current application pattern that is a combination of the high-side U-phase UH and a low-side W-phase WL, (3) a third current application pattern that is a combination of a high-side V-phase VH and the low-side W-phase WL, (4) a fourth current application pattern that is a combination of the high-side V-phase VH and a low-side U-phase UL, (5) a fifth current application pattern that is a combination of a high-side W-phase WH and the low-side U-phase UL, and (6) a sixth current application pattern that is a combination of the high-side W-phase WH and the low-side V-phase VL.

Further, as described above, the control circuit unit 3 outputs the control signal Sd2 of the voltage value of either the low or high level to apply the control voltage to the control terminal of the second drive circuit 52. Thereby, whether or not to perform the supplying actions of the drive current by the second drive circuit 52 can be switched by the control circuit unit 3.

Note here that the control circuit unit 3 functioning as the monitoring unit monitors a supplying state of the power to the first drive circuit 2 from the direct current power supply. The control circuit unit 3 is connected to an end portion of the main fuse 7 on the three-phase inverter circuit 2a side via a resistance R5. That is, to the control circuit units 3, inputted is a monitoring voltage Vs corresponding to the voltage of the end portion of the main fuse 7 on the three-phase inverter circuit 2a side via the resistance R5. The control circuit unit 3 monitors the state of the direct current power supply by monitoring the value of the monitoring voltage Vs.

Figure 3:
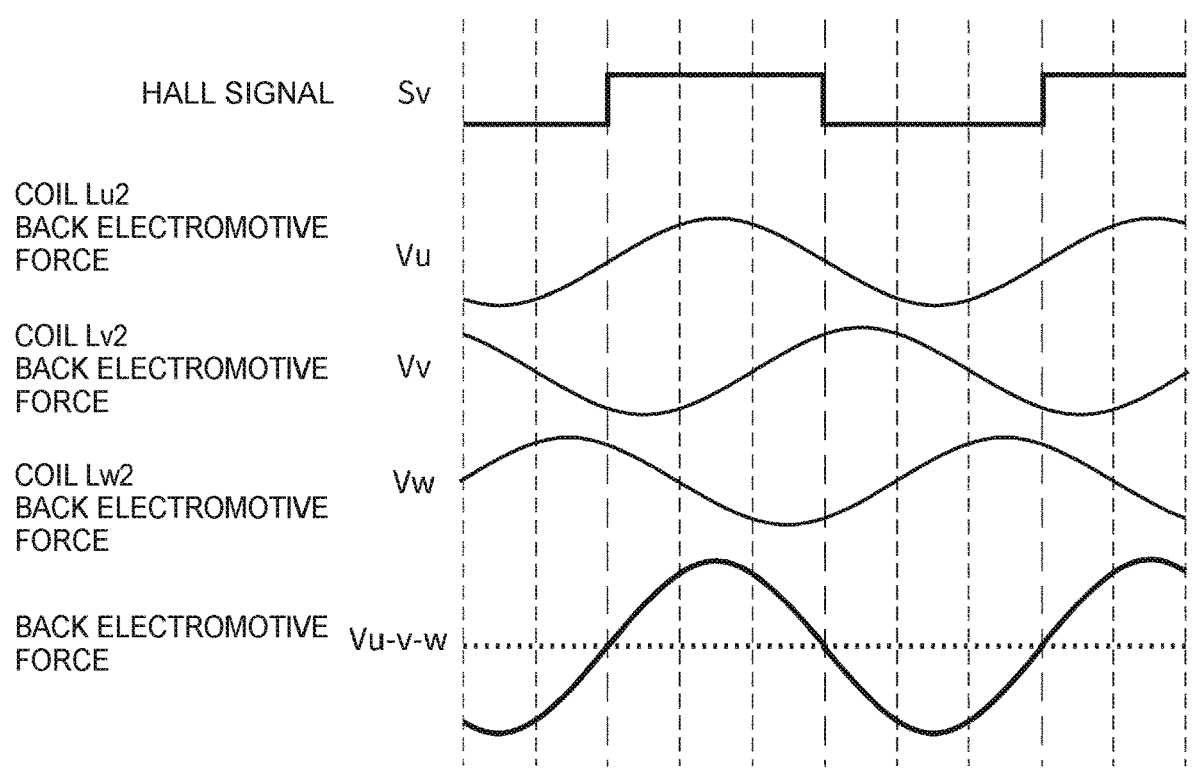
FIG. 3 is a chart for describing supplying actions of a drive current for the motor at the time of single-phase drive.

FIG. 3 is a chart that shows how the drive current is supplied to the motor 20 at the time of single-phase drive.

Shown in FIG. 3 are an example of a waveform of a Hall signal Sv regarding the V-phase output from the position sensor 5, examples of waveforms of respective back electromotive forces Vu, Vv, and Vw of the coils Lu2, Lv2, and Lw2 of the single phase, and an example of a waveform of a back electromotive force Vu-v-w (a synthesized force of the back electromotive force Vu, the back electromotive force Vv with inverted polarities, and the back electromotive force Vw with inverted polarities) of the coils Lu2, Lv2, and Lw2 of the single phase as a whole. As shown in the chart, through applying the drive current to flow in the coils Lu2, Lv2, and Lw2 of the single phase according to changing timing of the phase of the Hall signal Sv regarding the V-phase, the motor 20 of the three phases can be single-phase driven.

As shown in FIG. 3, rise points and fall points of the waveform of the Hall signal Sv are at positions corresponding to zero-cross points of the back electromotive force Vu-v-w. In other words, in the present embodiment, the position sensor 5 is placed at a position where rise or fall of the position signal occurs at the zero-cross point of the back electromotive force Vu-v-w of the coils Lu2, Lv2, and Lw2 of the single phase. Thereby, the motor 20 can be rotated by a simple control to switch a current applying direction of the coils Lu2, Lv2, and Lw2 of the single phase at the timings according to the rise and fall of the Hall signal Sv output from the position sensor 5 when single-phase driving the motor 20. Note that the position sensor 5 may be placed at a position where the rise or fall of the position signal occurs at an electric angle within a prescribed angle range with respect to the zero-cross point of the back electromotive force Vu-v-w of the coils Lu2, Lv2, and Lw2 of the single phase. The prescribed angle range is a range of ±30 degrees at the electric angle with respect to the zero-cross point of the back electromotive force Vu-v-w of the coils Lu2, Lv2, and Lw2 of the single phase. Thereby, the motor 20 can be rotated by simply switching the current applying direction of the coils Lu2, Lv2, and Lw2 of the single phase at the timings according to the rise and fall of the Hall signal Sv. Further, in a case where the number of turns of each of the coils Lu2, Lv2, and Lw2 of the single phase wound around the teeth 23 is equivalent, a wave crest value of the back electromotive force Vu-v-w can be made larger than a wave crest value of the back electromotive force Vu. As a result, a large torque can be acquired.

[Explanations of Motor Device 1 Actions]

In the present embodiment, a drive control method of the motor 20 for driving the motor 20 including the coils Lu, Lv, and Lw of the three phases and the coils Lu2, Lv2, and Lw2 of the single phase controls the action of the first drive circuit 2 by the control circuit unit 3 functioning as the drive control unit under a normal state (a drive control step). At this time, the drive current is not supplied to the motor 20 through the use of the second drive circuit 52. Further, in a case of driving the motor 20 by the first drive circuit 2, the control circuit unit 3 functioning as the detection unit detects that the first drive circuit 2 is in an abnormal state (a detection step). Then, when it is detected that the first drive circuit 2 is in the abnormal state, the control circuit unit 3 functioning as the switching unit switches the drive circuit for supplying the drive current to the motor 20 from the first drive circuit 2 to the second drive circuit 52 (a switching step).

Figure 4:
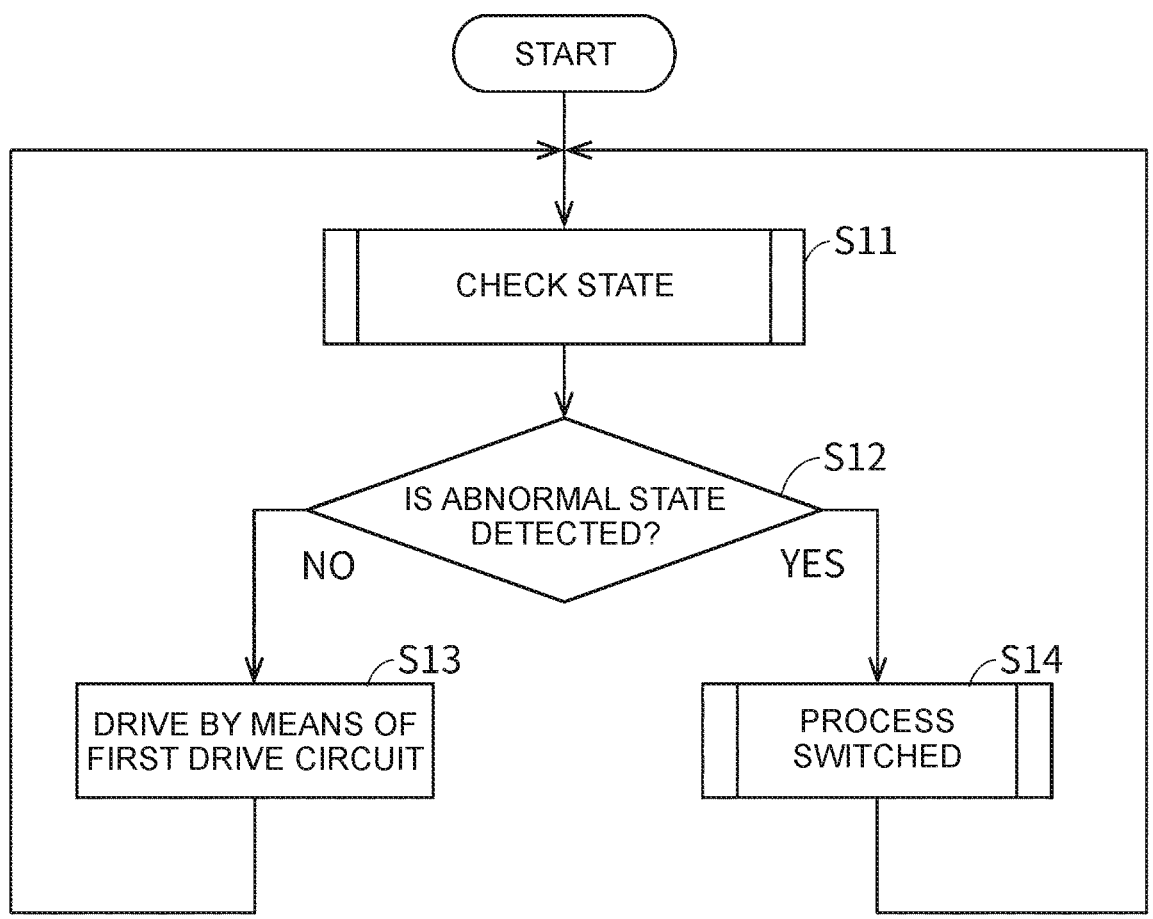
FIG. 4 is a flowchart for describing control actions of a control circuit unit.

FIG. 4 is a flowchart that shows the control actions of the control circuit unit 3.

A series of processing shown in FIG. 4 is the processing executed repeatedly during the actions of the motor device 1.

In step S11, the control circuit unit 3 performs state checking processing of the motor device 1.

Figure 5:
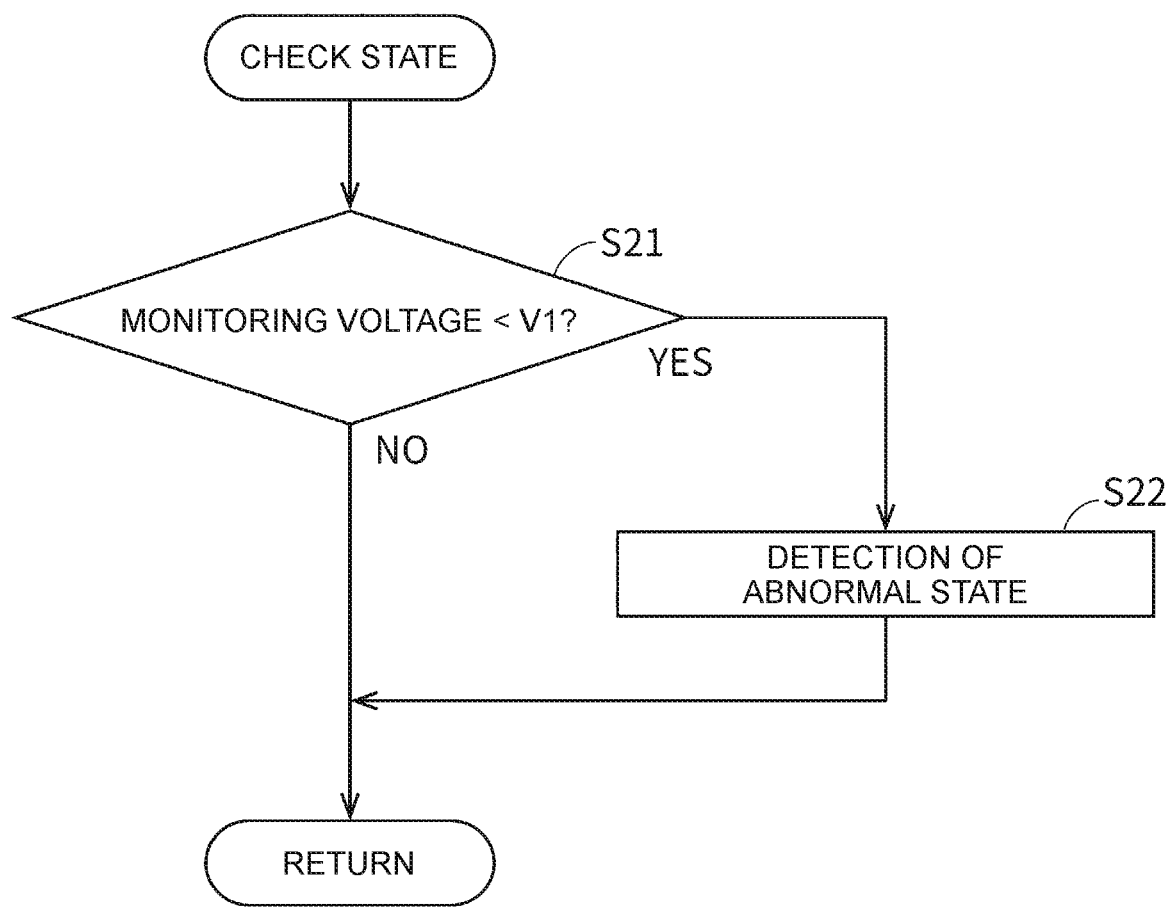
FIG. 5 is a flowchart showing an example of state checking processing.

FIG. 5 is a flowchart showing an example of the state checking processing.

The control circuit unit 3 performs the state checking processing to detect that the first drive circuit 2 is in an abnormal state.

As shown in FIG. 5, in step S21, the control circuit unit 3 determines whether or not the monitoring voltage Vs is lower than a prescribed voltage threshold value V1. When the monitoring voltage Vs is equal to or higher than the voltage threshold value V1 (NO), the control circuit unit 3 does not determine it as being in the abnormal state and ends the state checking processing.

When the monitoring voltage Vs is lower than the voltage threshold value V1 (YES), the control circuit unit 3 detects the abnormal state in step S22. When the abnormal state is detected, the state checking processing is ended.

In the following case, for example, the control circuit unit 3 functions as the detection unit to detect that the first drive circuit 2 is in the abnormal state. That is, there is a case of having a short-circuit caused by one of the switching elements Q1 to Q6 of the three-phase inverter circuit 2*a* fails, for example (an example of the abnormal state). When such failure occurs, a large electric current is flown to the first drive circuit 2 and the electric current flown to the main fuse 7 becomes larger so that the main fuse 7 blows out. Then, the monitoring voltage V1 decreases to a value less than the voltage threshold value V1, so that the control circuit unit 3 detects the abnormal state.

Returning to FIG. 4, in step S12, the control circuit unit 3 determines whether or not the abnormal state is detected in the state checking processing. When it is determined that the abnormal state is not detected in the state checking processing (NO), the processing proceeds to step S13. When it is determined that the abnormal state is detected in the state checking processing (YES), the processing proceeds to step S14.

In step S13, the control circuit unit 3 continues the drive of the motor 20 by the first drive circuit 2. That is, the control circuit unit 3 outputs the drive control signal Sd1 for driving the motor 20 to the first drive circuit 2 and applies the drive current to the motor 20 by the first drive circuit 2. Thereby, the motor device 1 performs three-phase drive of the motor 20. When the processing of step S13 is ended, the processing returns to step S11.

In the meantime, in step S14, the control circuit unit 3 processes switching. In the present embodiment, the control circuit unit 3 outputs the control signal Sd2 of the voltage value of the high (the prescribed drive voltage) level to apply the control voltage to the control terminal of the second drive circuit 52 so as to switch the drive circuit for supplying the drive current to the motor 20 from the first drive circuit 2 to the second drive circuit 52.

Figure 6:
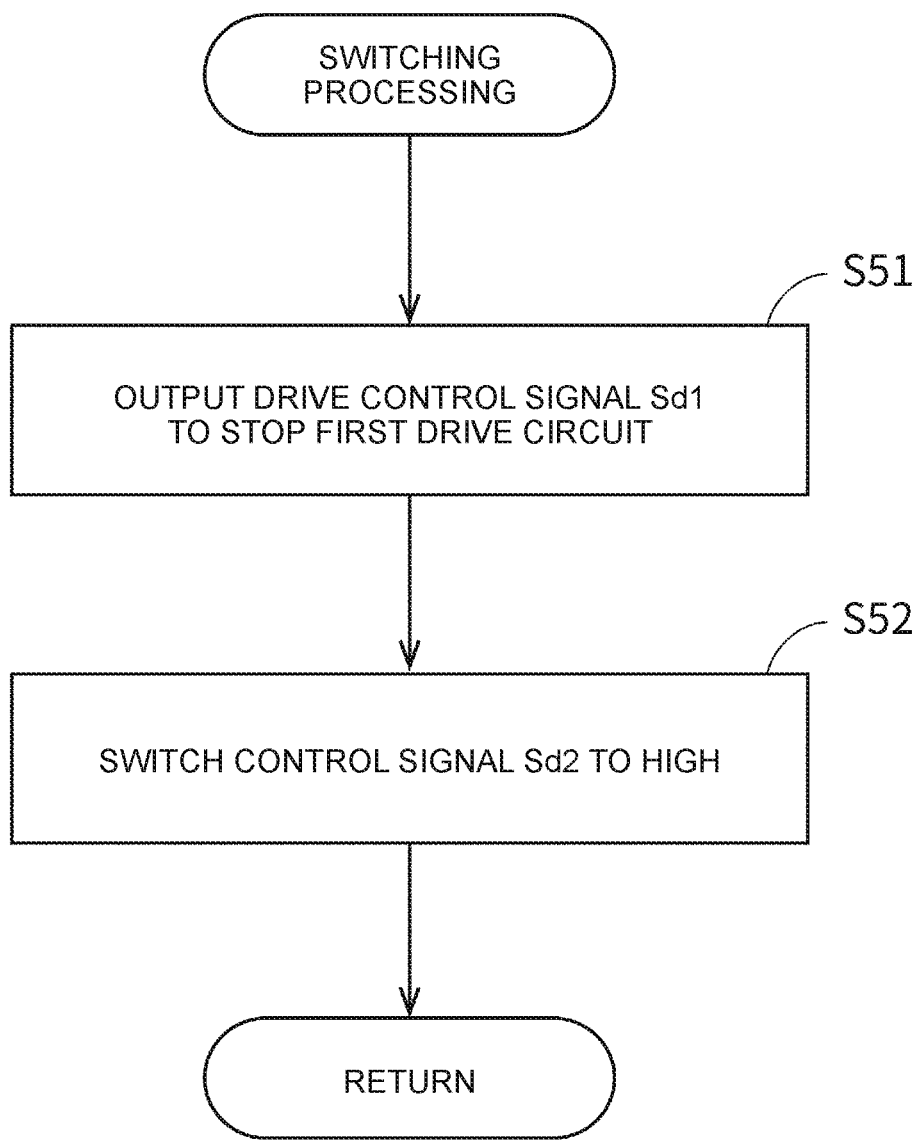
FIG. 6 is a flowchart showing an example of switching processing.

FIG. 6 is a flowchart showing an example of the switching processing.

In step S51, the control circuit unit 3 outputs the drive control signal Sd1 to stop the first drive circuit 2. Thereby, supplying of the drive current to the motor 20 by the drive circuit 2 is stopped.

In step S52, the control circuit unit 3 switches the control signal Sd2 from low (the reference voltage) to high (the prescribed voltage). Thereby, the supply of the drive current by the second drive circuit 52 starts.

When the processing of step S53 is ended, the switching processing is ended. Then, returning to FIG. 4, the processing is returned to step S11.

As described above, in the present embodiment under a normal drive state, the motor 20 is driven in three-phases by the first drive circuit 2 including the three-phase inverter circuit 2*a*. When something abnormal occurs in the first drive circuit 2, the drive circuit is switched to the second drive circuit 52 including the single-phase inverter circuit 52*a*, and the motor 20 is single-phase driven by the second drive circuit 52. That is, the motor device 1 includes the first drive circuit 2 used as a main drive circuit for applying an electric current to the coils Lu, Lv, and Lw of the three phases of the motor 20, and includes the second drive circuit 52 used as a backup circuit for applying an electric current to the coils Lug, Lv2, and Lw2 of the single phase of the motor 20. The second drive circuit 52 is separate from the first drive circuit 2. The second drive circuit 52 used as the backup circuit is a circuit of a simple structure and single-phase drives the motor 20. Therefore, the circuit scale of the motor device 1 can be made relatively small, so that low manufacturing cost can be maintained.

In a case where only the first drive circuit 2 is provided in the motor device 1, it is not possible to prevent the motor 20 from being rotated inversely by an external force when the first drive circuit 2 breaks down so that the motor 20 cannot be driven. Even if a short brake is applied, the motor 20 cannot be stopped even though the rotation speed of the inverse rotation can be reduced.

Meanwhile, in the present embodiment, even if the state of the motor device 1 becomes abnormal due to a failure or the like of the first drive circuit 2, the second drive circuit 52 of the simple structure can apply a torque by the single-phase drive to the motor 20. Therefore, at least the motor 20 can be prevented from being rotated inversely. In addition, when the external force for inversely rotating the motor 20 is small, the motor 20 can be rotated forward. Therefore, it is possible with the present embodiment to maintain low manufacturing cost of the motor device 1 and also to suppress an effect even when an abnormal state occurs in the motor device 1 so that it becomes impossible to drive the motor 20 as in a normal state.

There may be a method of sharing a part of the coils used for the three-phase drive with the coils used for the single-phase drive. However, in the present embodiment, the coils Lu2, Lv2, and Lw2 of the single phase used for the single-phase drive are coils independent from the coils Lu, Lv, and Lw of the three phases used for the three-phase drive. Therefore, even if an abnormal state (disconnection, short-circuit, or the like, for example) occurs in one of the coils Lu, Lv, and Lw of the three phases, it is possible to perform single-phase drive without suffering the effects of the influence of such a state. Further, if driving coils are shared, a switch may be required for shutting down a drive path so that the drive current is not flown from one of the drive circuits to the other drive circuit(s). In the embodiment, however, a three-phase drive system and a single-phase drive system are independent from each other, so that such switching is unnecessary. Therefore, the circuit structure of the motor device 1 can be simplified, and a component mount area can be reduced. Further, since the coils Lu2, Lv2, and Lw2 of the single phase are independent from the coils Lu, Lv, and Lw of the three phases, the structure of the coils Lu2, Lv2, and Lw2 of the single phase can be designed freely without taking the three-phase drive into consideration.

When the first drive circuit 2 breaks down in the motor device 1 using the motor 20 used as a fan motor, for example, the fan may be rotated inversely because there is a pressure difference generated between inside and outside or there is a wind blowing against the fan. Even in such a case, in the present embodiment, the motor 20 can be single-phase driven by the second drive circuit 52. Thus, it is possible to maintain the motor 20 in a stop state so as not to rotate the fan inversely and to rotate the motor 20 forward. Therefore, even when the first drive circuit 2 breaks down, it is possible to prevent a decrease in the cooling effectivness of the fan motor.

Figure 7:
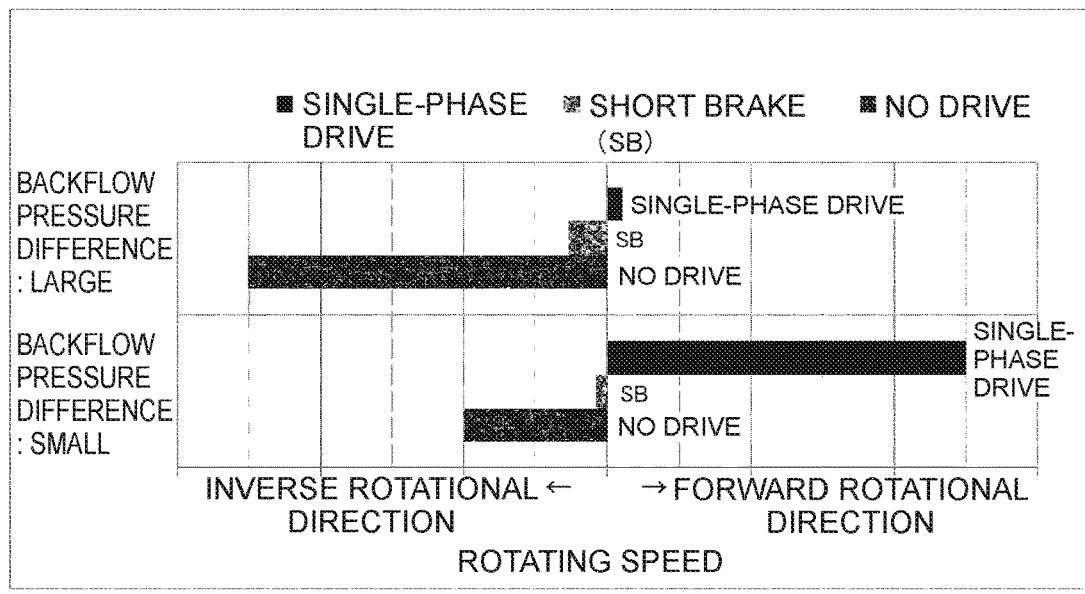
FIG. 7 is a graph for describing a specific example of a state of the motor in a case where an external force is applied to the motor used as a fan motor when a drive circuit for driving coils of three phases of the fan motor becomes inoperative, stopping the drive of the fan motor.

FIG. 7 is a graph for describing a specific example of a state of the motor 20 in a case where an external force is applied to the motor 20 used as the fan motor, when the drive circuit for driving the coils of the three phases of the fan motor becomes inoperative so that drive of the fan motor stops.

In FIG. 7, shown are rotation frequencies of the motor 20 in three cases each under a condition where a pressure difference for generating backflow is relatively large ("pressure difference: large") and under a condition where a pressure difference is relatively small ("pressure difference: small"). The three cases are a case in which the motor 20 is single-phase driven by the second drive circuit 52 as the present embodiment ("single-phase drive"), a case in which a short brake is applied on a motor as a conventional case ("SB"), and a case in which braking control of the motor by a motor drive control device is not performed ("no drive") as in a conventional case.

As shown as "no drive" in FIG. 7, in the case where no drive control of the motor is performed by the motor drive control device as in the conventional case, the motor is rotated inversely (referred to as backflow) in an opposite direction (inverse rotational direction) with respect to a forward rotational direction by the external force both in the case of "pressure difference: large" and in the case of "pressure difference: small".

Further, as shown as "SB" in FIG. 7, when the short brake is applied to the motor as drive control executed by the motor drive control device as the conventional case, the rotation frequency of the motor becomes lowered in opposition to the external force. However, the motor under each of the conditions is rotated inversely (backflow) by the external force even at the low rotation frequency.

In the meantime, as shown as "single-phase drive" in FIG. 7, the motor 20 in the motor device 1 according to the present embodiment is single-phase driven by the second drive circuit 52 so that the motor 20 rotates in the forward direction under both conditions. When a relatively small external force for inversely rotating the motor 20 as in the case under the "pressure difference: small" condition is applied to the motor 20, the motor 20 can be rotated in the forward direction at a relatively high rotation frequency, for example. Even when a relatively large external force for inversely rotating the motor 20 as in the case under the "pressure difference: large" condition is applied to the motor 20, the motor 20 can be rotated in the forward direction even though the rotation frequency is low. Therefore, the motor device 1 according to the present embodiment can avoid backflow.

Also, in the present embodiment, one position sensor 5 is used in common for the case where the drive current is supplied to the motor 20 from the first drive circuit 2 and for the case where the drive current is supplied to the motor 20 from the second drive circuit 52. Therefore, it is possible to simplify the circuit structure of the motor device 1 and to reduce the manufacturing cost of the motor device 1.

[Explanations of Variants]

In the motor 20 used in the motor device 1, the single-phase coil may only be wound around at least one of the plurality of teeth 23 around which the coils Lu, Lv, and Lw of the three phases are wound.

For example, the coils Lu2 and Lv2 of the single phase may be formed with the coil Lu2 wound around all of the plurality of teeth 23 around which the coil Lu of the U-phase is wound and with the coil Lv2 wound around all of the plurality of teeth 23 around which the coil Lv of the V-phase is wound. Further, the coil Lu2 of the single phase may be formed with the coil Lu2 wound around all of the plurality of teeth 23 around which the coil Lu of the U-phase is wound.

Furthermore, the coil Lu2, Lu2 of the single phase may be formed with the coil Lu2 wound around only a part of the teeth among the plurality of teeth 23 around which the coil Lu of the U-phase is wound and with the coil Lu2 wound around only a part of the teeth 23 among the plurality of teeth 23 around which the coil Lw of the W-phase is wound. Further, the coil Lu2 of the single phase may be formed with the coil Lu2 wound around only a part of the teeth 23 among the plurality of teeth 23 around which the coil Lu of the U-phase is wound.

Figure 8:
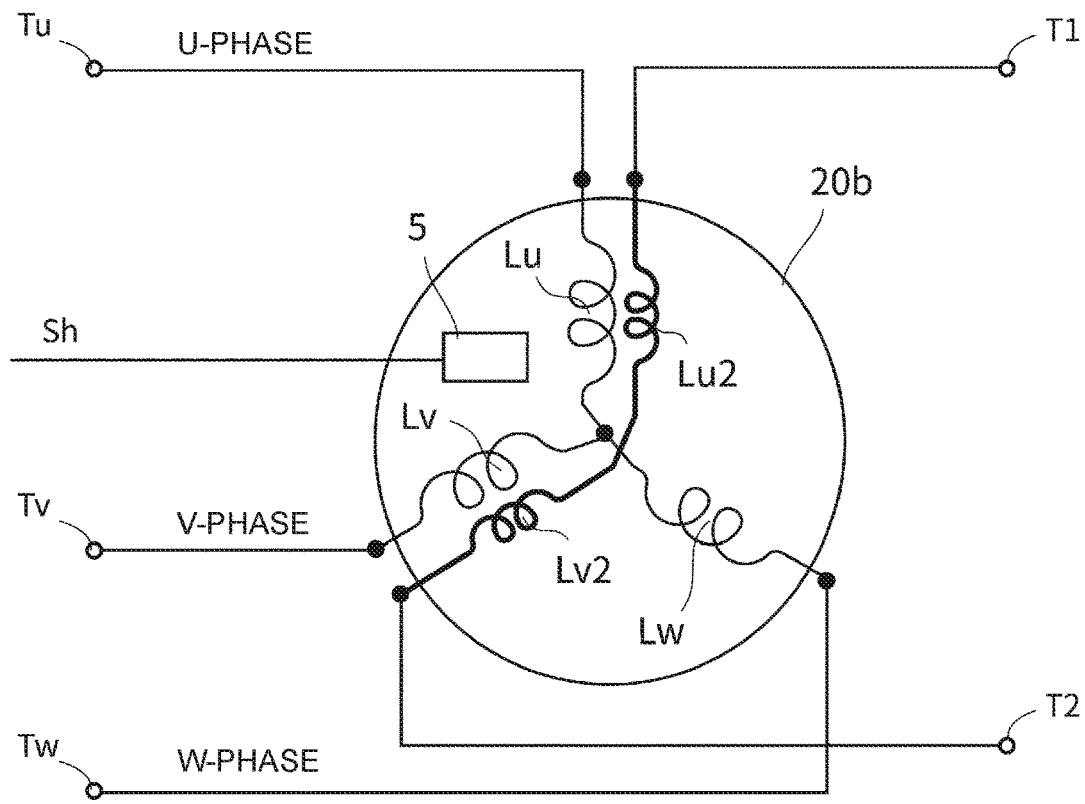
FIG. 8 is a diagram showing a variant of the motor capable of being used for the motor device of the present embodiment.

FIG. 8 is a diagram showing a variant of a motor 20 capable of being used for the motor device 1 of the present embodiment.

As shown in FIG. 8, the motor 20b includes the coils Lu2 and Lv2 of the single phase. Each of the coils Lu2 and Lv2 of the single phase is wound around at least one of the plurality of teeth 23 around which the coils Lu and Lv among the coils Lu, Lv, and Lw of the three phases are wound. That is, the coil Lu2, Lv2 of the single phase is formed by connecting the coil Lu2 wound around the teeth 23 around which the coil Lu of the U-phase is wound with the coil Lv2 wound around the teeth 23 around which the coil Lv of the V-phase is wound. The coil Lu2, Lv2 of the single phase includes two ends. Both ends of the coil Lu2, Lv2 of the single phase are connected to the two output terminals T1 and T2 of the second drive circuit 52.

Figure 9:
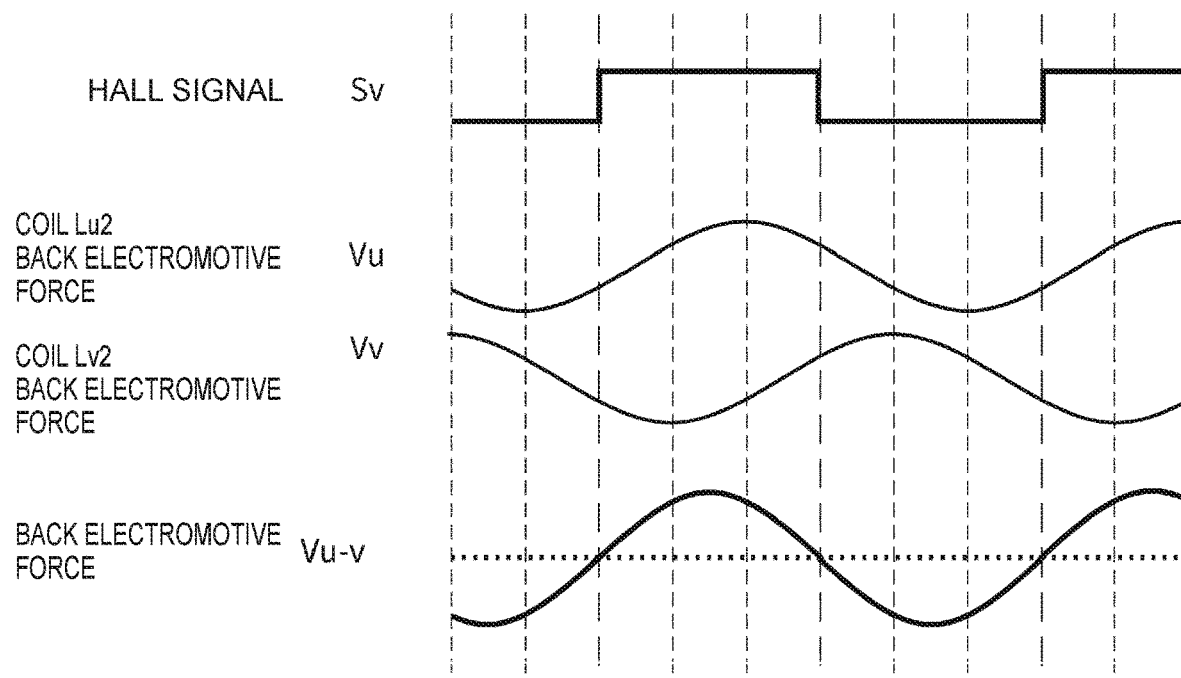
FIG. 9 is a chart for describing supplying a drive current to a motor 20b at the time of single-phase drive.

FIG. 9 is a chart for describing the supplying actions of the drive current for the motor 20b at the time of single-phase drive.

Shown in FIG. 9 are an example of a waveform of the Hall signal Sv regarding the V-phase output from the position sensor 5, examples of waveforms of the respective back electromotive forces Vu and Vv of the coils Lu2 and Lv2 of the single phase, and an example of a waveform of a back electromotive force Vu-v (a synthesized force of the back electromotive force Vu and the back electromotive force Vv with inverted polarities) of the coils Lu2 and Lv2 of the single phase as a whole. As shown in the chart, through applying the drive current to flow in the coils Lu2 and Lv2 of the single phase according to changing timings of the phase of the Hall signal Sv regarding the V-phase, the motor 20b of the three phases can be single-phase driven.

As shown in FIG. 9, the rise points and fall points of the waveform of the Hall signal Sv are at the positions corresponding to zero-cross points of the back electromotive force Vu-v. In other words, in the present variant, the position sensor 5 is placed at a position where rise or fall of the position signal occurs at the zero-cross point of the back electromotive force Vu-v of the coil Lu2, Lv2 of the single phase. Thereby, the motor 20b can be rotated by a simple control to switch the current application direction of the coil Lu2, Lv2 of the single phase at the timings according to the rise and fall of the Hall signal Sv output from the position sensor 5 when single-phase driving the motor 20b. Note that the position sensor 5 may be placed at a position where the rise or fall of the position signal occurs at the electric angle within a prescribed angle range with respect to the zero-cross point of the back electromotive force Vu-v of the coil Lu2, Lv2 of the single phase. The prescribed angle range is a range of ±30 degrees at the electric angle with respect to the zero-cross point of the back electromotive force Vu-v of the coil Lu2, Lv2 of the single phase. Thereby, the motor 20b can be rotated by a simple control to switch the current application direction of the coil Lu2, Lv2 of the single phase at the timings according to the rise and fall of the Hall signal Sv.

Further, in a case where the number of turns of each of the coils Lu2 and Lv2 of the single phase wound around the teeth 23 is equivalent, the wave crest value of the back electromotive force Vu-v of the coil Lu2, Lv2 of the single phase of the motor 20b can be made larger than the wave crest values of the back electromotive forces Vu and Vv. As a result, a large torque can be achieved.

Figure 10:
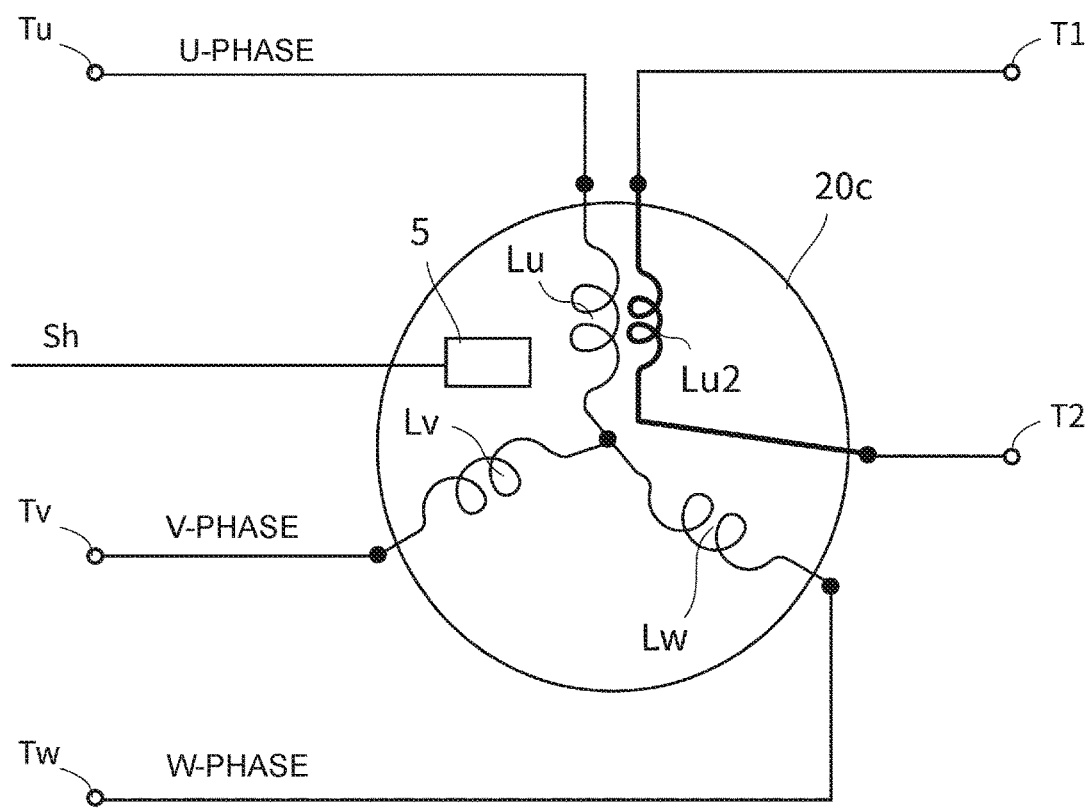
FIG. 10 is a diagram showing another variant of the motor capable of being used for the motor device of the present embodiment.

FIG. 10 is a diagram showing another variant of a motor 20 capable of being used for the motor device 1 of the present embodiment.

As shown in FIG. 10, the motor 20c includes the coil Lu2 of the single phase. The coil Lu2 of the single phase is wound around at least one of the plurality of teeth 23 around which the coil Lu among the coils Lu, Lv, and Lw of the three phases is wound. That is, the coil Lu2 of the single phase is the coil Lu2 wound around the teeth 23 around which the coil Lu of the U-phase is wound. The coil Lu2 of the single phase includes two ends. Both ends of the coil Lu2 of the single phase are connected to the two output terminals T1 and T2 of the second drive circuit 52.

Figure 11:
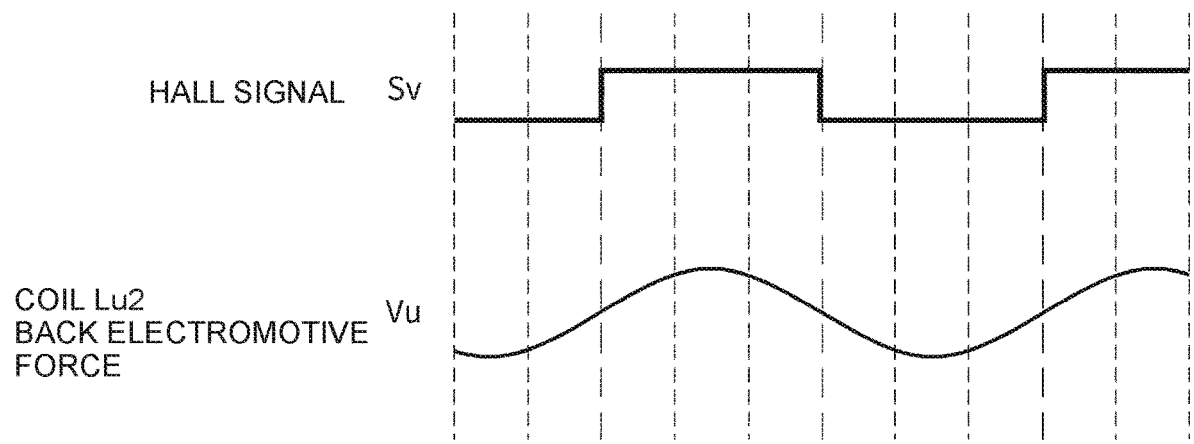
FIG. 11 is a chart for describing supplying a drive current for a motor 20c at the time of single-phase drive.

FIG. 11 is a chart for describing the applying actions of the drive current for the motor 20c during single-phase drive.

Shown in FIG. 11 are an example of a waveform of the Hall signal Sv regarding the V-phase output from the position sensor 5, and an example of a waveform of the back electromotive force Vu of the coil Lu2 of the single phase. As shown in the chart, through causing the drive current to flow in the coil Lu2 of the single phase according to changing timings of the phase of the Hall signal Sv of the V-phase, the motor 20c of the three phases can be single-phase driven.

As shown in FIG. 11, the rise points and fall points of the waveform of the Hall signal Sv are at the positions corresponding to zero-cross points of the back electromotive force Vu. In other words, in the present variant, the position sensor 5 is placed at a position where rise or fall of the position signal occurs at the zero-cross point of the back electromotive force Vu of the coil Lu2 of the single phase. Thereby, the motor 20c can be rotated by a simple control to switch the current applying direction of the coil Lu2 of the single phase at the timings according to the rise and fall of the Hall signal Sv output from the position sensor 5 when single-phase driving the motor 20c. Note that the position sensor 5 may be placed at a position where the rise or fall of the position signal occurs at the electric angle within a prescribed angle range with respect to the zero-cross point of the back electromotive force Vu of the coil Lu2 of the single phase. The prescribed angle range is a range of ±30 degrees at the electric angle with respect to the zero-cross point of the back electromotive force Vu of the coil Lu2 of the single phase. Thereby, the motor 20c can be rotated by a simple control to switch the current applying direction of the coil Lu2 of the single phase at the timings according to the rise and fall of the Hall signal Sv.

Note that the wave crest value of the back electromotive force Vu of the coil Lu2 of the single phase of the motor 20c becomes smaller than the wave crest values of the back electromotive force Vu-v of the coil Lu2, Lv2 of the single phase of the motor 20b.

Effects similar to those described in the embodiment described above can be acquired even in the cases of using the above-described motors 20b and 20c.

Figure 12:
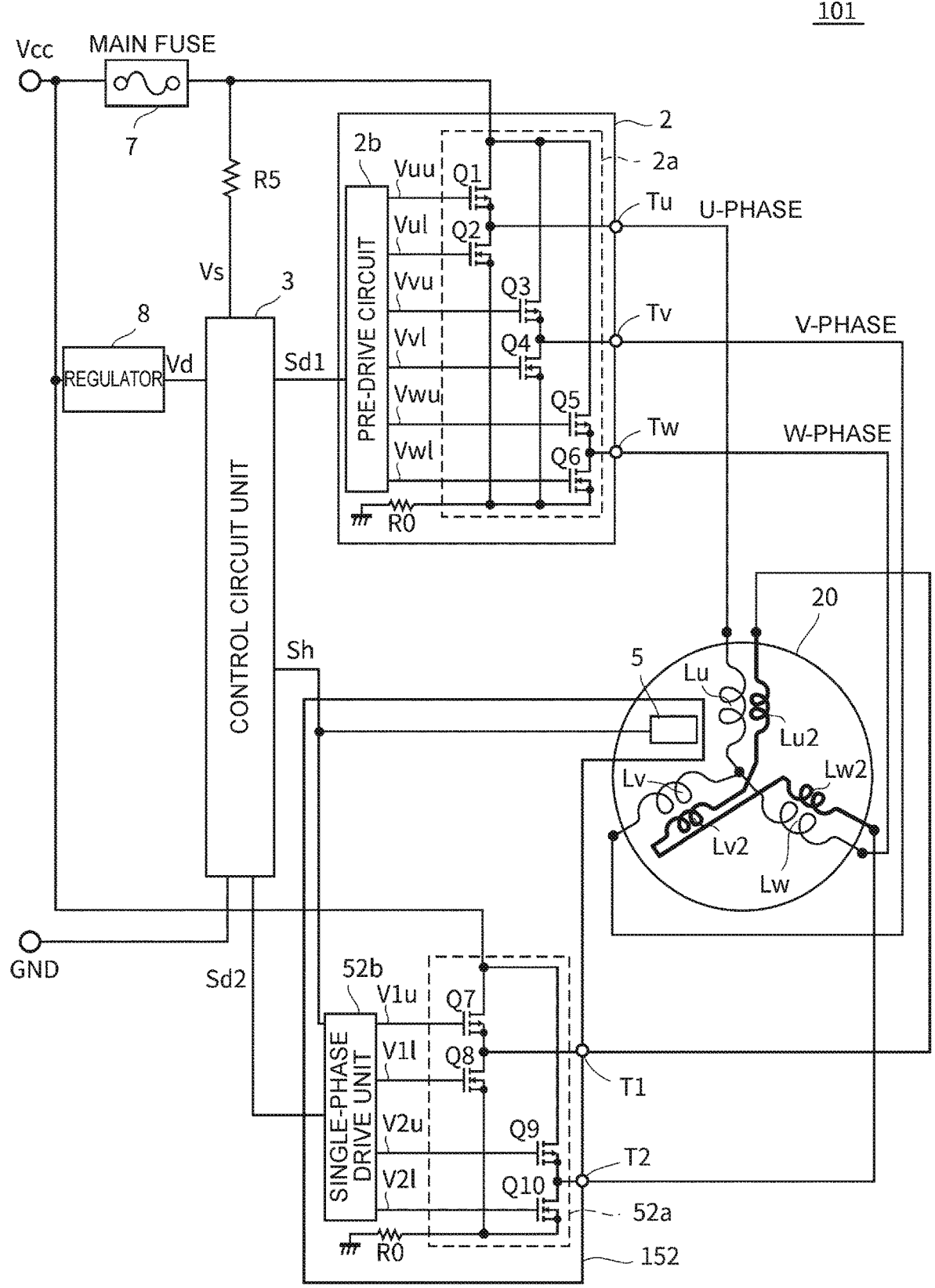
FIG. 12 is a diagram showing a motor device according to a variant of the present embodiment.

FIG. 12 is a diagram showing a motor device 101 according to a variant of the present embodiment.

As shown in FIG. 12, the motor device 101 includes a second drive circuit 152 having the position sensor 5 built therein. The second drive circuit 152 performing single-phase drive is a type with a relatively small circuit scale, and is capable of having the position sensor 5 built therein. By using the second drive circuit 152 having the position sensor 5 built therein as described above, the mount area of the motor drive control device on a circuit board can be reduced and the manufacturing cost can be reduced as well. In this case, the position sensor 5 may also be placed at a position where the rise or fall of the position signal occurs at the electric angle within a prescribed angle range with respect to the zero-cross point of the back electromotive force Vu-v-w of the coils Lug, Lv2, and Lw2 of the single phase. The similar effects as those of the embodiment described above can be acquired even with the motor device 101 of such structure.

Figure 13:
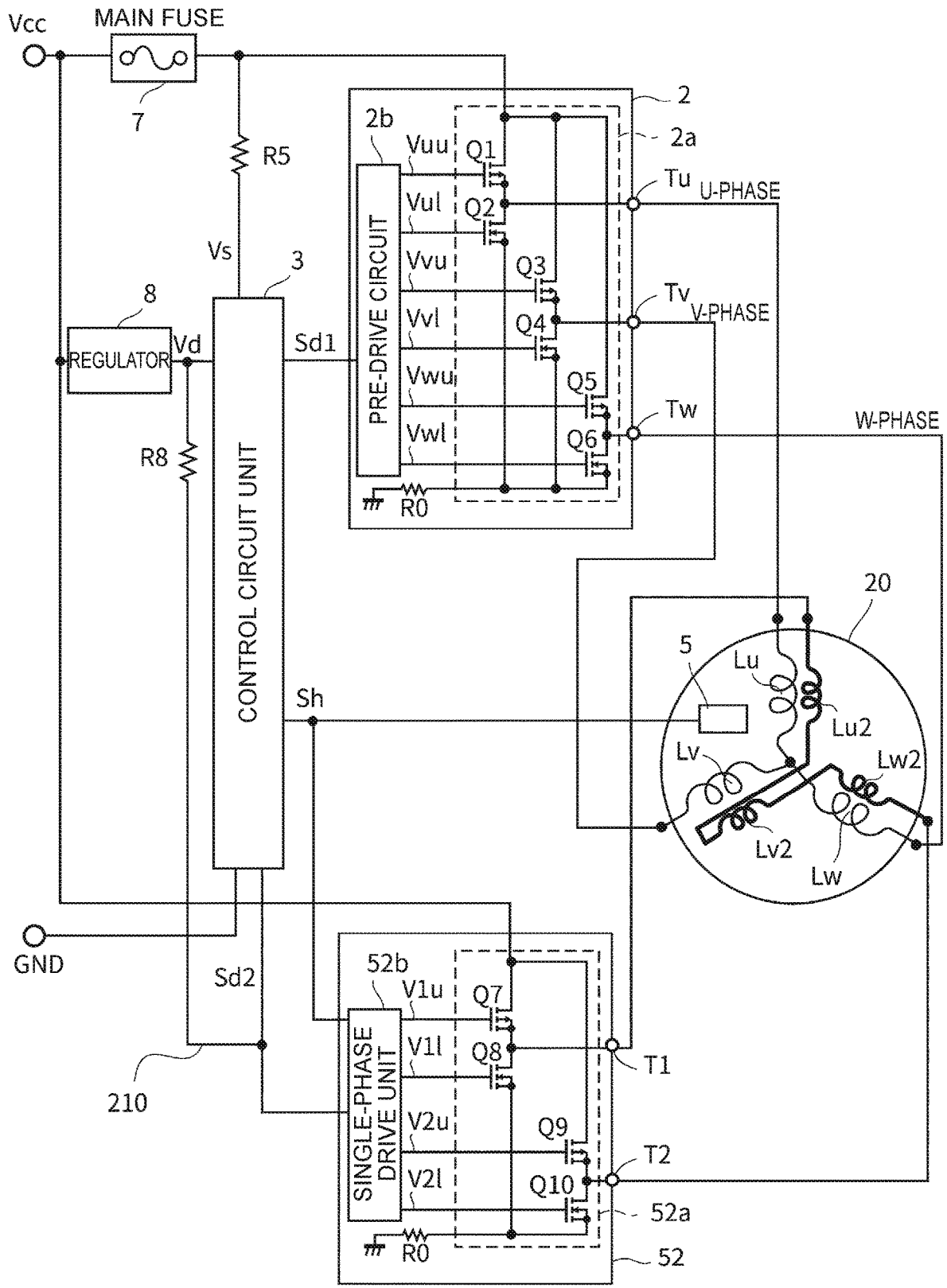
FIG. 13 is a diagram showing a motor device according to another variant of the present embodiment.

FIG. 13 is a diagram showing a motor device 201 according to another variant of the present embodiment.

As will be described in detail hereinafter, in the motor device 201, terminals to which the control voltage of the second drive circuit 52 is applied are connected to voltage sources of prescribed drive voltages. In a case where neither the action of the control circuit unit 3 as the drive control unit nor the action as the switching unit is performed, the drive current is supplied to the motor 20 by the second drive circuit 52 through applying the prescribed drive voltages by the voltage sources.

As shown in FIG. 13, the motor device 201 has a structure acquired by providing, in the structure of the motor device 1 according to the present embodiment described above, a bypass 210 connecting, via a resistance R8, an output end of the regulator (an example of the voltage source) 8 with a control terminal of the second drive circuit 52 where the control signal Sd2 is input. That is, the drive voltage Vd generated by the regulator 8 is applied via the bypass 210 to the control terminal of the second drive circuit 52 where the control signal Sd2 is input.

In the present variant, the motor device 201 has such a structure. Therefore, even in a case where the control circuit unit 3 fails so that neither the action as the drive control unit nor the action as the switching unit is performed by the control circuit unit 3, the motor 20 can be single-phase driven by driving the second drive circuit 52. That is, under a normal state, the second drive circuit 52 performs no supplying action of the drive current since the control signal Sd2 output by the control circuit unit 3 is the control voltage of the ground. Note here that when the control circuit unit 3 breaks down, for example, so that the control signal Sd2 is not output from the control circuit unit 3 and the output terminal of the control signal Sd2 of the control circuit unit 3 is opened, the drive voltage (an example of the prescribed drive voltage) Vd is applied to the control terminal of the second drive circuit 52 by the regulator 8. Therefore, the drive current is supplied to the motor 20 by the second drive circuit 52. As in the case of the present embodiment described above, it is possible to prevent the motor 20 from being rotated in the opposite direction even in a case where the mainly used drive circuit fails.

[Others]

Kinds of the abnormal states generated in the first drive circuit 2 are not limited to the above-described states where the power supply is shut down. As the abnormal states, the control circuit unit 3 may detect an abnormal state where the switching elements Q1 to Q6 of the three-phase inverter circuit 2a fail, and an abnormal state where an overcurrent is flown to the first drive circuit 2. For example, through monitoring an increase in the drive current of the first drive circuit 2 based on the voltage value acquired by the sense resistance R0, for example, the abnormal states can be detected. Further, the abnormal state of having an overvoltage may be detected by monitoring the monitoring voltage Vs corresponding to the power supply voltage Vcc. Also, an abnormal state of having a high temperature may be detected based on detected values of the temperatures of a temperature sensor provided to the first drive circuit 2, based on detected values of the temperatures of a temperature sensor provided inside a microcomputer or the like.

Figure 14:
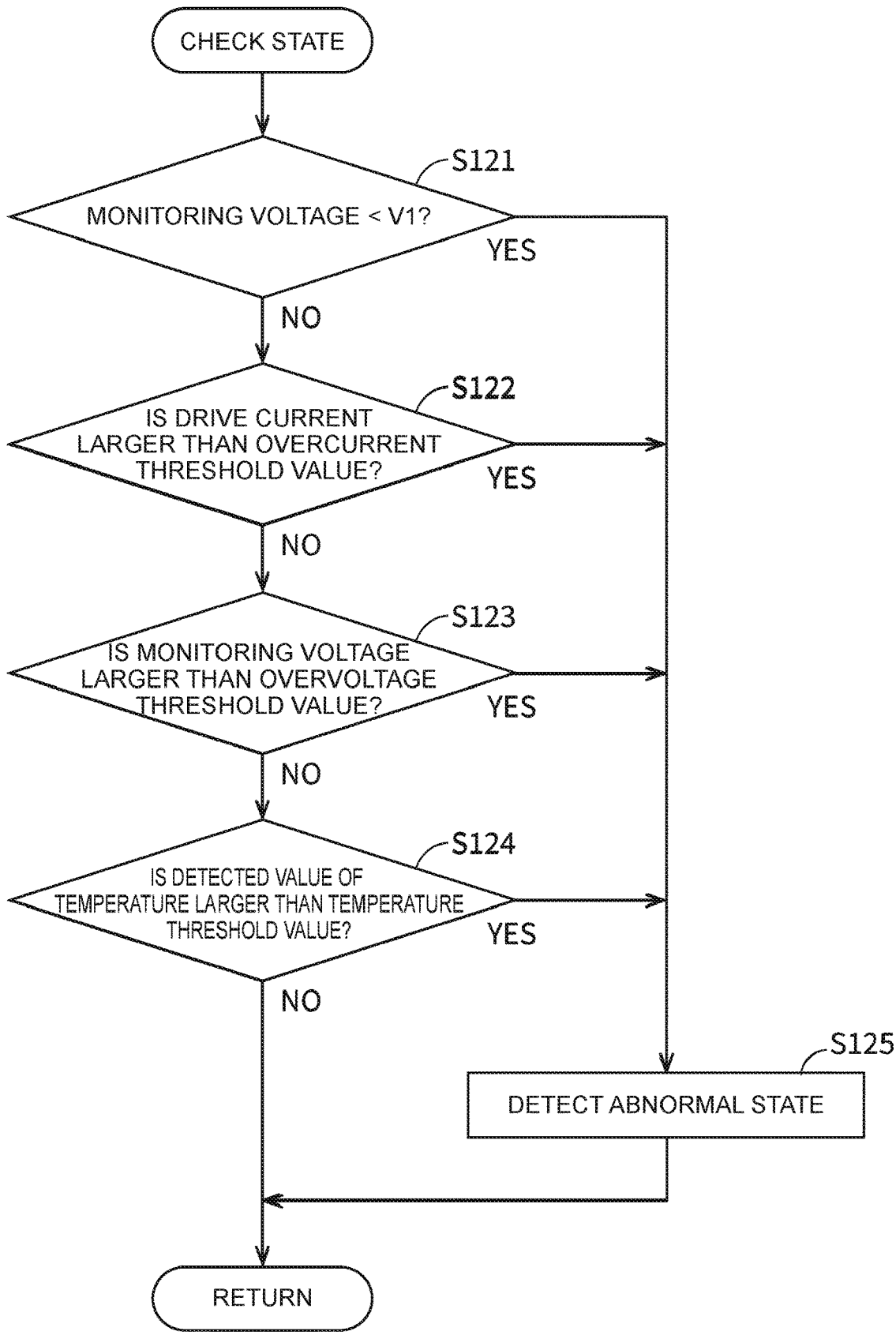
FIG. 14 is a flowchart for describing a variant of state checking processing.

FIG. 14 is a flowchart for describing a variant of state checking processing.

As shown in FIG. 14, for example, the state checking processing may be processing for detecting the abnormal state when one of various conditions is satisfied. That is, the control circuit unit 3 determines whether the monitoring voltage Vs is smaller than the threshold value V1 (S121), whether the drive current is larger than a prescribed overcurrent threshold value (S122), whether the monitor voltage Vs is larger than the prescribed overvoltage threshold value (S123), and whether the detected value of the temperature is larger than a prescribed temperature threshold value (S124) in this order. Upon determining that any one of the conditions is satisfied (YES in any one of steps S121 to S124), the control circuit unit 3 detects the abnormal state in step S125. Thereby, the drive circuit for supplying the drive current to the motor 20 is switched to the second drive circuit 52. Note that the order of determination is not limited to the order shown in FIG. 14.

The position sensor 5 is provided by correspondence to the three phases, and the drive control of the motor 20 may be performed based on the position signals of each of the three phases when supplying the drive current to the motor 20 by the first drive circuit 2.

Further, the motor 20 may be driven by the so-called sensor-less system without provision of the position sensor 5.

The processing of the present embodiment described above may be executed by software or by using hardware circuits.

It is also possible to provide a program executing the processing in the foregoing embodiment or to provide users with the program recorded on a recording medium (a non-transitory computer readable medium) such as a CD-ROM, flexible disk, hard disk, ROM, RAM, or memory card. The program may be downloaded to the device via a communication system such as the Internet. The processing described in writings in the flowcharts is executed by a CPU or the like according to the program.

It is to be understood that the foregoing embodiments are therefore to be considered in all respects as illustrative and not restrictive. The scope of the present disclosure is indicated by the scope of the appended claims rather than the foregoing description, and all changes which come within the meaning and scope of equivalency of the claims are therefore intended to be encompassed therein.

What is claimed is:

1. A motor device comprising:
a motor having coils of three phases and a single-phase coil;
a drive circuit of a first system capable of supplying a drive current to the coils of the three phases; and
a drive circuit of a second system capable of supplying a drive current to the single-phase coil, the drive circuit of the second system being different from the drive circuit of the first system, wherein
the drive circuit of the first system comprises a three-phase inverter circuit connected to one end of each of the coils of the three phases, and
the drive circuit of the second system comprises a single-phase inverter circuit connected to both ends of the single-phase coil,
wherein the single-phase coil comprises first and second coils wound in series,
the first coil being wound around teeth around which the coil of a first phase among the coils of the three phases is wound, and
the second coil being wound around teeth around which the coil of a second phase among the coils of the three phases is wound.

2. The motor device according to claim 1, wherein the single-phase coil is wound, respectively, around at least one of teeth around which the coil of a first phase among the coils of the three phases is wound, at least one of teeth around which the coil of a second phase among the coils of the three phases is wound, and at least one of teeth around which the coil of a third phase among the coils of the three phases is wound.

3. The motor device according to claim 2, wherein a winding direction of the single-phase coil for the teeth around which the coil of any one phase among the coils of the three phases is wound is different from a winding direction of the single-phase coil for the teeth around which the coils of the other two phases are wound.

4. The motor device according to claim 1, further comprising:
a drive control unit configured to drive the motor by the drive circuit of the first system by controlling an action of the drive circuit of the first system;
a detection unit configured to detect that the drive circuit of the first system is in an abnormal state; and
a switching unit configured to switch the drive circuit for supplying the drive current to the motor from the drive circuit of the first system to the drive circuit of the second system when the detection unit detects that the drive circuit of the first system is in the abnormal state.

5. The motor device according to claim 4, further comprising a monitoring unit configured to monitor an applied power state to the drive circuit of the first system from a power supply, wherein
the detection unit detects that the drive circuit of the first system is in the abnormal state according to a monitored result acquired by the monitoring unit.

6. The motor device according to claim 4, further comprising a single position sensor configured to output a position signal according to a position of a rotor of the motor, wherein:
the drive control unit controls the action of the drive circuit of the first system based on the position signal;
the drive circuit of the second system comprises a single-phase drive unit configured to control an action of the single-phase inverter circuit; and
the single-phase drive unit controls the action of the single-phase inverter circuit based on the position signal.

7. The motor device according to claim 6, wherein:
the position sensor is a magnetic sensor; and
the position sensor is placed such that rise or fall of the position signal occurs at an electric angle within a prescribed angle range with respect to a zero-cross point of a back electromotive force of the single-phase coil.

8. The motor device according to claim 7, wherein the prescribed angle range is a range of ±30 degrees at the electric angle.

9. The motor device according to claim 6, wherein the position sensor is built into the drive circuit of the second system.

10. The motor device according to claim 4, wherein:
the switching unit performs switching of the drive circuit applying the drive current to the motor through applying a control voltage to the drive circuit of the second system; and
the drive circuit of the second system supplies no drive current when the control voltage is a reference voltage, and supplies the drive current when the control voltage is a prescribed drive voltage.

11. The motor device according to claim 10, wherein:
a terminal is connected to a voltage source configured to output the prescribed drive voltage, the control voltage of the drive circuit of the second system being applied to the terminal; and
when neither the drive control unit action nor the switching unit action is performed, the prescribed voltage is applied by the voltage source so that the drive current is supplied to the motor by the drive circuit of the second system.

12. A motor drive control method for driving a motor comprising coils of three phases and a single-phase coil, the motor drive control method executed by using:
a drive circuit of a first system capable of supplying a drive current to the coils of the three phases, the drive circuit of the first system comprising a three-phase inverter circuit connected to one end of each of the coils of the three phases; and
a drive circuit of a second system capable of supplying a drive current to the single-phase coil, the drive circuit of the second system comprising a single-phase inverter circuit connected to both ends of the single-phase coil and being different from the drive circuit of the first system, the motor drive control method comprising:
a drive control step of driving the motor by the drive circuit of the first system by controlling an action of the drive circuit of the first system;
a detection step of detecting that the drive circuit of the first system is in an abnormal state in a case where the motor is driven by the drive circuit of the first system; and
a switching step of switching the drive circuit for supplying the drive current to the motor from the drive circuit of the first system to the drive circuit of the second system when it is detected in the detection step that the drive circuit of the first system is in the abnormal state,
wherein the single-phase coil comprises first and second coils wound in series,
the first coil being wound around teeth around which the coil of a first phase among the coils of the three phases is wound, and
the second coil being wound around teeth around which the coil of a second phase among the coils of the three phases is wound.

13. A motor device comprising:
a motor having coils of three phases and a single-phase coil;
a drive circuit of a first system capable of supplying a drive current to the coils of the three phases; and
a drive circuit of a second system capable of supplying a drive current to the single-phase coil, the drive circuit of the second system being different from the drive circuit of the first system, wherein
the drive circuit of the first system comprises a three-phase inverter circuit connected to one end of each of the coils of the three phases, and
the drive circuit of the second system comprises a single-phase inverter circuit connected to both ends of the single-phase coil,
wherein the single-phase coil comprises first, second and third coils wound in series that are wound, respectively, around at least one of teeth around which the coil of a first phase among the coils of the three phases is wound, at least one of teeth around which the coil of a second phase among the coils of the three phases is wound, and at least one of teeth around which the coil of a third phase among the coils of the three phases is wound.

* * * * *